United States Patent [19]

Bronstert et al.

[11] Patent Number: 5,003,010

[45] Date of Patent: Mar. 26, 1991

[54] SALTS OF POLYVALENT CATIONS WITH BLOCK POLYMERS OF VINYLAROMATICS AND CONJUGATED DIENES

[75] Inventors: Klaus Bronstert, Carlsberg; Wolfgang F. Mueller, Neustadt, both of Fed. Rep. of Germany

[73] Assignee: BASF Aktiengesellschaft, Ludwigshafen, Fed. Rep. of Germany

[21] Appl. No.: 420,710

[22] Filed: Oct. 12, 1989

Related U.S. Application Data

[63] Continuation of Ser. No. 923,095, Oct. 24, 1986, abandoned.

[30] Foreign Application Priority Data

Oct. 24, 1985 [DE] Fed. Rep. of Germany ....... 3537771

[51] Int. Cl.$^5$ ............................................ C08F 297/04
[52] U.S. Cl. .................................... 525/314; 525/366; 525/370
[58] Field of Search ......................... 525/314, 366, 370

[56] References Cited

U.S. PATENT DOCUMENTS

| 3,976,628 | 8/1976 | Halasa et al. | 525/366 |
| 4,104,330 | 8/1978 | Danzig et al. | 260/880 B |
| 4,465,809 | 8/1984 | Smith | 525/385 |
| 4,603,171 | 7/1986 | Hsieh et al. | 525/314 |

Primary Examiner—John C. Bleutge
Assistant Examiner—Vasu S. Jagannathan
Attorney, Agent, or Firm—Keil & Weinkauf

[57] ABSTRACT

Block polymers of vinylaromatics and conjugated dienes which posses acidic terminal groups and are in the form of salts which contain divalent or polyvalent metal cations or cation complexes. A process for the preparation of such salts of block polymers containing acid groups, and the use of these polymers as thermoplastic materials, as thermoplastic elastomers, for modifying thermoplastic materials, as viscosity index improvers in lubricating oils or as components in hot melt adhesives.

3 Claims, No Drawings

SALTS OF POLYVALENT CATIONS WITH BLOCK POLYMERS OF VINYLAROMATICS AND CONJUGATED DIENES

This applicaton is a continuation of application Ser. NO. 923,095, filed on Oct. 24, 1986, now abandoned.

The present invention relates to block polymers of vinylaromatics and conjugated dienes, the said polymers possessing acidic terminal groups and being in the form of salts of metal cations or metal cation complexes which carry not less than two positive charges.

Block polymers of styrene and butadiene which are obtained using a lithium-hydrocarbon as an initiator and carry terminal carboxyl groups are known. They are disclosed in, for example, German Laid-Open Application DOS 2,723,905, where these compounds are obtained by subjecting first styrene and then butadiene to anionic polymerization, then reacting the living block polymer with an alkylene oxide, eg. ethylene oxide, and finally subjecting the reaction product to a further reaction with a cyclic dicarboxylic anhydride. The block polymers obtained carry terminal carboxyl groups. Block polymers of this type have different properties, depending on the styrene content; for example, those which have a high styrene content can be used as thermoplastics. If the content of polybutadiene units predominates, polymers of this type can be employed as thermoplastic rubbers, ie. as molding materials which have elastomeric properties at room temperature and can be processed by thermoplastic shaping. We have found that, although the mechanical and processing properties are adequate for certain purposes in most cases, they are still unsatisfactory for some applications.

It is an object of the present invention to improve the mechanical and processing properties of such block polymers containing terminal carboxyl groups.

We have found that this object is achieved by block polymers which possess terminal carboxyl groups and are in the form of salts of the general formula $$[R-Y_a-X^\ominus]_n [M]^{n\oplus}$$

where M is a metal cation or a metal cation complex, X is a group of the general formula

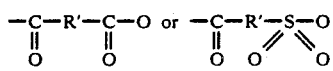

in which R' is a divalent organic radical, Y is an alkylene oxide unit, R is a polymer of a vinylaromatic compound, n is from 2 to 10 and a is from 1 to 10.

The present invention furthermore relates to a process for the preparation of block polymers by anionic polymerization of vinylaromatics and conjugated dienes and reaction of the resulting living block polymers with an alkylene oxide and a cyclic anhydride, wherein the reaction product obtained is reacted with a metal alcoholate, a metal halide, a metal oxide or a metal hydroxide, and excess anhydride is removed or blocked by derivatization.

The present invention also relates to the use of block polymers of this type as thermoplastic materials, for modifying thermoplastic materials, as viscosity improvers in lubricating oils, as components in hot melt adhesives, as molding materials and as components of molding materials.

Other subjects of the invention are evident from the description below.

The novel salts of the block polymers of vinylaromatics and conjugated dienes, which possess terminal carboxyl groups, have outstanding mechanical properties coupled with very good processing characteristics. In particular, the compounds have a greater tensile strength, a higher modulus of elasticity and excellent impact strength properties compared with block polymers of the same composition and same molecular weight. The good flow is noteworthy.

In the salts of the above general formula, M is a metal cation or a metal cation complex, the cations and the cation complexes carrying not less than two positive charges. In the formula, n may be 2, 3 or 4. Metal ocations such as $Al^{+++}$, $Mg^{++}$, $Zn^{++}$, $Ni^{++}$, $Zr^{++}$ or $Cd^{++}$, are preferred. However, it is also possible to use cation complexes, for example those which contain a plurality of metal cations. Examples of suitable structures are $[Me-O[Me(OR'')-O]_rMe]^{4+}$, where Me is $Al^{+++}$ or $Cr^{+++}$, r is an integer from 0 to 20, preferably from 0 to 10, and R'' is hydrogen or a short-chain alkyl radical.

In the general formula, X is a group of the general formula

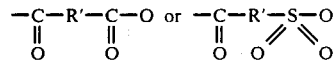

where R' is a divalent organic radical. Groups of this type are obtained if living anionic block polymers obtained in a lithiumalkyl-catalyzed reaction are reacted first with an alkylene oxide and then with a cyclic anhydride. Suitable cyclic anhydrides are aliphatic, cycloaliphatic or aromatic dicarboxylic anhydrides or cyclic anhydrides of sulfocarboxylic acids. Examples of cylic anhydrides of sulfocarboxylic acids are β-sulfopropionic anhydride and o-sulfobenzoic anhydride. Preferred groups of this type are those which are derived from maleic acid, succinic acid, phthalic acid, glutaric acid or naphthalene-1,8-dicarboxylic acid. R' is

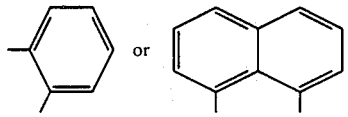

Y is an alkylene oxide group. Preferred groups are those which are obtained from ethylene oxide, propylene oxide or styrene oxide. In the general formula, as stated above, n is 2 or an integer greater than 2, preferably 3 or 4, m is from 1 to 10, and a is from 1 to 10, preferably from 1 to 4.

R is a radical of a block polymer of a vinylaromatic compound and a conjugated diene, the said polymer being obtained by subjecting the starting monomers to a lithiumalkyl-catalyzed reaction. The starting materials for these block polymers are monovinylaromatic monomers, such as styrene, styrenes which are alkylated in the side chain eg. α-methylstyrene, and styrenes which are substituted in the nucleus, eg. vinyltoluene or ethylvinylbenzene. The monovinylaromatic monomers may also be used in the form of mixtures. However, styrene alone is preferably used. Examples of conjugated dienes which are present as copolymerized units in the block polymers are butadiene, isoprene and 2,3-dimethylbutadiene. Butadiene and isoprene are particularly advantageous, butadiene being preferred.

If the novel salts of carboxyl-containing block polymers are to be used as thermoplastics, the polymer component R contains, as copolymerized units, more than 60, preferably from 70 to 90, % by weight of monovinylaromatic monomers. If the block polymers are to be used as thermoplastic elastomers, the content of copolymerized monovinylaromatic monomers is from 3 to 40% by weight. The remaining amount to 100% is accounted for by the copolymerized conjugated dienes in the radical R. The block polymer may have an A-B structure, A representing a polymer unit which contains the monovinylaromatic monomers as copolymerized units, and block B representing the polymer moiety which is built up from the conjugated dienes. In this case, either block A or block B may be bonded to the alkylene oxide unit Y. However, block polymers of the A-B-A or B-A-B type may also be used. The groups of blocks may be repeated several times. Preferred polymer units R are those which consist of only two blocks A and B, block B being bonded to the alkylene oxide unit Y. The polymer blocks or segments A have a molecular weight of from 1500 to 150,000, preferably from 5000 to 100,000, and the polymer blocks or segments B have a molecular weight of from 2000 to 200,000, preferably from 20,000 to 100,000. The transition between two polymer blocks A and B may be abrupt (sharply separated blocks) or gradual (indistinct or conical blocks).

Such block polymers containing indistinct or conical blocks are obtained if a mixture of, for example styrene and butadiene is polymerized. Other useful block polymers are those in which the blocks A and B are copolymers of the monovinylaromatic monomers and the conjugated dienes. The glass transition temperature of the polymer blocks or segments A in such polymers is greater than 0° C., preferably greater than 20° C. The polymer blocks or segments B have a glass transition temperature of less than 0° C., preferably less than $-15°$ C. In the block polymer component R, it is also possible for some or all of the olefinic double bonds originating from the diene building blocks to be hydrogenated.

The unit Y is an alkylene oxide unit, preferably derived from ethylene oxide, propylene oxide or styrene oxide. a may be from 1 to 10, preferably 1 to 4. These alkylene oxide units Y are obtained if the living polymer obtained by lithiumalkyl-catalysis is reacted with the alkylene oxides. The reaction is preferably carried out using a ratio of 1 mole of alkylene oxide to 1 mole of the living polymer. This reaction gives lithium alcoholate terminal groups.

The group X is of the general formula given above. It is incorporated by a procedure in which the reaction product of the living polymer with the alkylene oxide is reacted with a cyclic anhydride.

A preferred process for the preparation of block polymers comprises subjecting the monomers to anionic polymerization, reacting the resulting living block polymers with an alkylene oxide and then reacting the product with a cyclic anhydride. For the reaction of the polymeric lithium alcoholates with a cyclic anhydride, it is necessary in general to use more than the stoicheometric amount of the anhydride in order to achieve an adequate conversion. A conversion of not less than 50%, preferably 60%, optimally 70%, of the terminal groups is regarded as sufficient. Such conversions are in general only achieved if not less than 1.25, preferably 1.75, equivalents of the cyclic anhydride are used per lithium alcoholate terminal group. When the mixture is worked up by precipitating the polymer with an alcohol or expeling the solvent with steam (steam stripping), and when the polymer is stored under ambient conditions (room temperature, about 50% relative humidity), excess anhydride and water or alcohol produce dioic acids or ester acids, which remove the cation from the polymer. The resulting polymer with a protonated acid group on the end of the chain then exhibits physical behavior very similar to that shown by the conventional polymer of the same molecular weight. It is therefore necessary to remove the excess anhydride before the working up stage or to convert it to a derivative which does not interact with the cation of the terminal acidic group of the polymer.

A suitable method of removing the excess anhydride is, for example, a treatment under reduced pressure (1-100 mbar) at elevated temperatures (160°-240°C.). The result of this treatment is further improved if small amounts of high boiling, inert entraining agents are added to the polymer before the treatment. Examples of suitable substances are hydrocarbons, such as ethyl benzene, xylene, dodecane, etc. Particularly useful entraining agents are those whose boiling point is close to or somewhat above the boiling points of the cyclic anhydrides, eg. tetralin, decalin, diphenyl, diphenyl ether or an industrial white oil fraction having a boiling range of, for example, 230°-260° C. or 240°-280° C. 0.5°-10% of entraining agent are added to the polymers before the treatment under reduced pressure; in the case of high boiling entraining agents, smaller amounts are sufficient, but in the case of lower boiling ones it is necessary to add a correspondingly greater amount. The treatment itself can be carried out batchwise, for example in heated vacuum cabinets, where it is advantageous to evaporate the solvents from the polymer solution in a layer which is not excessively thick. The treatment can also be carried out continuously, for example in an extruder under reduced pressure. In the usual procedure, the hot polymer solution is fed in at the rear end of the machine and then transported by the screws, with heating, through a plurality, eg. 3, devolatolization zones, the highest temperature and the highest vacuum being present in the final devolatolization zone. After solvents, entraining agents and excess anhydride have been removed, the polymer is discharged through dies, for example cooled with water, and pressed to give bales.

The excess anhydride can, however, also be blocked by derivatization, for example by reaction with metal hydroxides (eg. NaOH) to give the salts of the dibasic acids, or with metal alcoholates to give the salts of their half esters. It is particularly advantageous for the salts formed to be insoluble in the polymer matrix and to form a separate phase which cannot interact with the metal cations of the terminal acid group of the polymer molecules.

Another possible method of rendering the excess anhydrides harmless is to react the polymer solution, before the working up stage, with an equimolar amount or an excess of the metal alcoholate which tends to form polynuclear complexes in which the salts of the half esters are bonded. The reaction with metal alcoholates can be effected so that the number of carboxyl-containing polymer radicals m is equal to the number of charges on the metal cation or on the metal cation complex n. However, as stated above, it is also possible to choose the ratios so that m is from 1 to 10 and n is 2, 3 or 4. The reaction of the metal alcoholates with carboxylic acids is known and is described in, for example, Kirk-Orthmer, Encyclopedia of Chemical Technology, 2nd edition, volume 1, pages 832-851.

The reaction of the carboxyl-containing polymers can be carried out using metalalkyls instead of alcoholates, examples of metalalkyls being aluminium triethyl, aluminum tri-tert-butyl, zinc diethyl, etc. However, the reactants should not be used in excess. The cation can also be added in the form of its oxides or hydroxides.

The novel salts of the block polymers containing acid groups can be used as thermoplastic elastomers or for modifying thermoplastic materials. In this case, they should contain from 3 to 40% by weight of styrene and from 97 to 60% by weight of diene units.

If, as stated above, they contain more than 50%, preferably from 70 to 90%, of styrene, the remainder being diene block polymer units, they may be used as highly impact resistant, transparent thermoplastics.

EXAMPLES

Preparation of the block polymers containing acid groups

Purified dry cyclohexane is introduced, under a nitrogen atmosphere, into a standard 5 l stainless steel kettle. Destabilized styrene is added, and the reaction mixture is heated to 50° C. To destroy proton-active impurities, the organometallic initiator (sec-butyllithium) is added a little at a time (in each case 5 ml of a 3% strength solution in hexane) until the occurrance of a pale red coloration indicates the beginning of polymerization.

The calculated amount of initiator is then added immediately, thus initiating the polymerization. At 50° C., the styrene undergoes quantitative polymerization in the course of 60 minutes. The purified and destabilized diene is then metered continuously to the living reaction mixture, the metering rate being set so that the internal temperature does not exceed 65° C. When the addition of the diene is complete, polymerization is continued for a further half hour at from 60° to 65° C. in order to ensure quantitative conversion of the diene (AB block). The mixture is then cooled to 40° C. At this temperature, the alkylene oxide, dissolved in distilled toluene, is added to the living polymer solution in order to convert the carban ion to the polymeric alcoholate anion. To ensure complete conversion, the mixture is stirred for 1 hour. Thereafter, the cyclic anhydride is added and stirring is continued for a further hour at 40° C. The lithium salt of the polymeric half ester of the dicarboxylic acid is formed.

The polyvalent cation, in the form of an alcoholate dissolved in toluene, tetrahydrofuran or another inert hydrocarbon solvent, is then added to the polymeric half ester; the amount of metal alcoholate is equivalent to or greater than the amount of anhydride. Before the working up procedure, 0.5% by weight, based on the polymer, of a phenolic stabilizer is added. The viscous polymer solution is then precipitated by pouring it into isopropanol, and the precipitate is washed twice with isopropanol and dried overnight in a drying oven under an $N_2$ atmosphere at 80° C. under reduced pressure.

Details of the individual Examples are given in the Tables below. Tables 1 and 2: Synthesis and analysis of the salts of polyvalent cations of block copolymers. Table 3: Mechanical properties of the salts of polyvalent cations of block polymers.

TABLE 1

| Example No. | Cyclohexane [ml] | BuLi [mmol] | A block styrene [g] | [% by weight] | Type | B block diene [g] | [% by weight] | Alkylene oxide Type | [mmol] | Anhydride Type | [mmol] |
|---|---|---|---|---|---|---|---|---|---|---|---|
| 1 | 3,000 | 11 | 93.6 | 16.4 | Bu | 478.4 | 83.6 | EO | 22 | SA | 22 |
| 2 | 3,000 | 11 | 93.6 | 16.4 | Bu | 478.4 | 83.6 | EO | 22 | Tetrahydrophthalic | 22 |
| 3 | 3,500 | 11 | 93.6 | 16.4 | Bu | 478.4 | 83.6 | PO | 22 | SA | 22 |
| 4 | 3,000 | 11 | 93.6 | 17.0 | I | 457.0 | 83.0 | PO | 22 | MA | 22 |
| 5 | 3,000 | 11 | 93.6 | 16.4 | Bu | 478.4 | 83.6 | Styrene oxide | 22 | SA | 22 |
| 6 | 3,000 | 11 | 93.6 | 16.4 | Bu | 478.4 | 83.6 | EO | 22 | Itaconic anhydride | 22 |
| 7 | 3,000 | 11 | 93.6 | 16.4 | Bu | 478.4 | 83.6 | EO | 22 | Glutaric | 22 |
| 8 | 3,000 | 9.2 | 93.6 | 16.4 | Bu | 478.4 | 83.6 | EO | 18 | MA | 18 |
| 9 | 2,500 | 14 | 203 | 29.1 | Bu | 494 | 70.9 | EO | 28 | SA | 28 |

BuLi = sec-butyllithium
EO = ethylene oxide
PO = propylene oxide
SA = Succinic anhydride
MA = Maleic anhydride

TABLE 2

| Example No. | Me compound Type | [mmol] | $H_2O$ [mmol] | AB block IV [cm³/g] | Before addition of cation IV [cm³/g] | After addition of cation IV [cm³/g] |
|---|---|---|---|---|---|---|
| 1-1 | Al isopropylate | 5.5 | — | 78 | 85 | 132 |
| 1-2 | Al isopropylate | 11 | — | 78 | 85 | 145 |
| 1-3 | Al isopropylate | 22 | — | 78 | 85 | 162 |
| 1-4 | Al isopropylate | 33 | — | 78 | 85 | 168 |
| 2-1 | Al isopropylate | 33 | — | 77 | 83 | 175 |
| 3-1 | Al isopropylate | 44 | — | 78 | 82 | 143 |
| 4-1 | — | — | — | 55 | 80 | — |
| 5-1 | Al isopropylate | 11 | 11 | 88 | 105 | 149 |
| 6-1 | Al isopropylate | 11 | 11 | 73 | 103 | 140 |
| 7-1 | Al isopropylate | 11 | 11 | 83 | 103 | 143 |
| 8-1 | Zn isopropylate | 36 | — | 100 | 129 | 151 |

TABLE 2-continued

| Example No. | Me compound Type | H₂O [mmol] | AB block IV [cm³/g] | Before addition of cation IV [cm³/g] | After addition of cation IV [cm³/g] |
|---|---|---|---|---|---|
| | [mmol] | | | | |
| 9-1 | Al isopropylate | 60 | — | 58 | 80 | 109 |

IV = Intrinsic viscosity, measured at 25° C. in toluene (0.5 g of polymer in 100 ml of toluene) according to DIN 51,562.

TABLE 3

| Example No. | Melt flow index (21.6 kp; 190° C.) | | Tensile strength at 300% elongation, N/mm² | | Elongation % | Ultimate tensile strength |
|---|---|---|---|---|---|---|
| | Before addition of the cation | After addition of the cation | Before addition of the cation | After addition of the cation | | |
| 1-1 | 23 | 20 | not measurable | 1.24 | 1,400 | 1.28 |
| 1-2 | 23 | 18 | not measurable | 1.27 | 1,330 | 1.35 |
| 1-3 | 23 | 17 | not measurable | 1.30 | 1,250 | 1.62 |
| 1-4 | 23 | 16 | not measurable | 1.31 | 1,220 | 1.92 |
| 2-1 | 24 | 16 | not measurable | 1.32 | 1,110 | 2.02 |
| 3-1 | 25 | 18 | not measurable | 1.28 | 1,250 | 2.1 |
| 4-1 | 27 | 27 | not measurable | not measurable | 500 | — |
| 5-1 | 19 | 15 | not measurable | 1.30 | 800 | 1.42 |
| 6-1 | 20 | 17 | not measurable | 1.29 | 1,100 | 1.96 |
| 7-1 | 20 | 17 | not measurable | 1.31 | 900 | 1.41 |
| 8-1 | 15 | 16 | not measurable | 1.35 | 1,100 | 1.92 |
| 9-1 | 25 | 20 | not measurable | 1.56 | 500 | 2.21 |

We claim:

1. A block polymer of vinylaromatics and conjugated dienes which possesses acidic terminal groups, the said polymer being in the form of a salt of the formula $$(R-Y_a-X^{\ominus})_n (M)^{n\oplus}$$

where M is a polyvalent metal cation or a metal cation complex, selected from the group consisting of aluminum, magnesium and zinc tri- and di-valent cations, X is a group of the formula

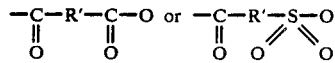

in which R¹ is a divalent organic radical, Y is an ethylene oxide unit, R is a block polymer of styrene and butadiene, said block polymer having the structure A-B, where A is a polystyrene block having a molecular weight of 5,000 to 100,000 and a glass transition temperature of greater than 20° C. and B is a polybutadiene block having a molecular weight of 20,000 to 100,000 and a glass transition temperature of less than −15° C., n is from 1 to 10 and a is 1.

2. The block polymer claim 1, wherein M can be an oxo or hydroxo cation complex of Al, Mg or Zn.

3. The block polymer of claim 1, wherein R¹ is $-CH_2-CH_2-$, $-CH=CH-$, $-CH_2-CH_2-CH_2$,

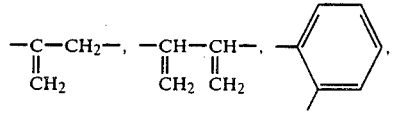

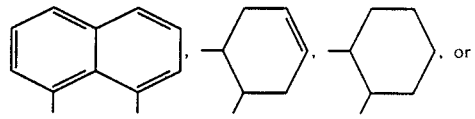

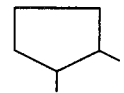

and these radicals in turn can be substituted by short alkyl chains and/or halogen.

* * * * *